United States Patent [19]
Abe et al.

[11] 3,821,081
[45] June 28, 1974

[54] PROCESS FOR PRODUCING 7-AMINO DESACETOXY CEPHALOSPORANIC ACID

[75] Inventors: Jinnosuke Abe, Tagata; Tetsuo Watanabe, Yokohama; Tsutomu Yamaguchi, Tagata; Kunio Matsumoto, Tagata; Tadashiro Fujii, Tagata, all of Japan

[73] Assignee: Toyo Jozo Company, Ltd., Tagata-gun, Shizuoka, Japan

[22] Filed: Mar. 15, 1972

[21] Appl. No.: 235,085

[30] Foreign Application Priority Data
May 31, 1971  Japan.............................. 46-38143

[52] U.S. Cl...................................... 195/29, 195/63
[51] Int. Cl................................................ C12b 1/00
[58] Field of Search...................................... 195/29

[56] References Cited
UNITED STATES PATENTS
3,304,236  2/1967  Nuesch et al......................... 195/29
3,749,641  7/1973  Takahashi et al................... 195/36 P Primary Examiner—Alvin E. Tanenholtz
Attorney, Agent, or Firm—Craig and Antonelli

[57] ABSTRACT
7-Amino desacetoxy cephalosporanic acid represented by the general formula,

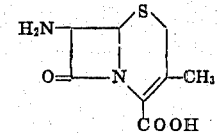

is produced according to a process in which an alkali metal salt of a 7-acylamino desacetoxy cephalosporanic acid represented by the general formula,

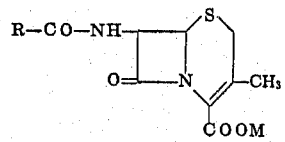

wherein R is a benzyl or phenoxymethyl group, and M is an alkali metal atom capable of forming a water-soluble salt, is treated with a carrier containing culture filtrate of an enzyme-producing strain belonging to the genus Bacillus which can decompose the amide bond of the said compound, said strain being *Bacillus megaterium* B-400 FERM-P No. 748, or is treated in an aqueous medium with an enzyme preparation containing said enzyme-producing strain.

4 Claims, No Drawings

PROCESS FOR PRODUCING 7-AMINO DESACETOXY CEPHALOSPORANIC ACID

This invention relates to a process for producing 7-amino desacetoxy cephalosporanic acid (hereinafter referred to as "7-ADCA") by enzymatically deacylating a 7-acylamino desacetoxy cephalosporanic acid. More particularly, the invention is concerned with a process for preparing 7-ADCA, i.e., 7-amino-3-methyl-$\Delta^3$-cephem-4-carboxylic acid, by use of an enzyme preparation derived from *Bacillus megaterium*.

Heretofore, 7-ADCA has been produced according to any of a process in which cephalosporin C is catalytically reduced in the presence of palladium-carbon to obtain 3-methyl-7-($\omega$-amino-adipolylamide)-$\Delta^3$-cephem-4-carboxylic acid, which is then deacylated by hydrolysis [U.S. Pat. No. 3,124,576 (1964)]; a process in which 7-aminocephalosporanic acid is deacylated by catalytic reduction (the same United State patent as mentioned above); and a process in which 3-methyl-7-phenoxy-acetamide-$\Delta^3$-cephem-4-carboxylate derived from phenoxymethyl penicillin is treated with $PCl_5$ in an anhydrous organic solvent in the presence of pyridine, and the resulting imide chloride is treated with an alcohol to form an imide ester, which is then subjected to hydrolysis [Belgian Pat. Nos. 717,741 (1969) and 737,761 (1970)].

All the above-mentioned processes, however, are chemical decomposition processes, and there has not been proposed any process for producing 7-ADCA enzymatically.

Perceiving the above-mentioned point, the present inventors continued extensive studies with an aim to enzymatically produce 7-ADCA with advantages and investigated various strains capable of deacylating 3-methyl-7-phenoxyacetamide-$\Delta^3$-cephem-4-carboxylic acid or 3-methyl-7-phenylacetamide-$\Delta^3$-cephem-4-carboxylic acid. As the result, the inventors have found that a strain B-400 belonging to the genus Bacillus which has been isolated from soil produces an enzyme capable of decomposing the amide bonds of 3-methyl-7-phenoxyacetamide-$\Delta^3$-cephem-4-carboxylic acid and 3-methyl-7-phenylacetamide-$\Delta^3$-cephem-4-carboxylic acid. The inventors have further found that when 3-methyl-7-phenyl-acetamide-$\Delta^3$-cephem-4-carboxylic acid is treated with an enzyme preparation derived from the abovementioned strain, there is produced a compound which is inactive in itself but can produce 7-ADCA quantitatively by the aid of phenylacetylchloride, and that when 3-methyl-7-phenoxyacetamide-$\Delta^2$-cephem-4-carboxylic acid is treated with the above-mentioned enzyme preparation, 7-amino-3-methyl-$\Delta^2$-cephem-4-carboxylic acid can also be produced.

Mycological properties of the abovementioned strain B-400 are as follows:

I. Morphological characteristics (slant culture on broth agar at 30° C. for 18 or 24 hrs.):
 1. Cells rod-shaped, chiefly in long chains, round ends.
 2. Size:1.2 to 1.5 by 2.0 to 3.5 microns.
 3. No pellicle.
 4. Motile, with flagella (periphery)
 5. Gram-positive.
 6. Spores (soybean agar at 30° C. 5 days):
   Size:1.0 to 1.2 by 1.5 to 2.0 microns.
   Shape oval.
   Position central to para-central.
   Sporangia not distinctly swollen.

II. Behaviors on various culture media:
 1. Broth agar streak plate (30° C. 24 hrs.):
   Good growth, circular, convexed, nonspreading, white to pale yellow, glossy, soft, wet, translucent; no change in color of medium.
 2. Broth agar slants (30° C. 24 hrs.):
   Good growth, surface smooth, nonspreading, glossy, wet. Colonies milky white, translucent; no change in color of medium.
 3. Broth (30° C. 2 days):
   Good growth, uniform turbidity, with sediment; no pellicle.
 4. Broth gelatin stab (30° C. 20 days):
   Surface growth to center along stab line. No gelatin liquefaction.
 5. Litmus milk (30° C. 20 days):
   Not peptonized; litmus pigment is reduced; culture liquor becomes yellowish brown.
 6. Soybean agar slants (30° C. 24 hrs.):
   Good growth white to yellowish white, surface smooth and soft. Good formation of spores.
 7. Glucose nitrate agar slant (30° C. 3 days):
   Growth scant.
 8. Tyrosine agar slants (30° C. 3 days):
   Good growth; medium is browned.
 9. Potato (30° C. 5 days):
   Good growth; colonies pink to brown, surface smooth and wet, convexed and glossy; medium is browned on about the third day.

III. Physiological properties:
 1. Optimum growth conditions:
   Aerobic, at pH 7.0 to 8.0 and 28° to 35° C.
 2. Growable conditions:
   Aerobic, at pH 5 to 10 and 7° to 45° C.
 3. Acid resistance:
   Low, no growth at below pH 5.0.
 4. Behavior to oxygen:
   Aerobic, no growth in glucose broth under anaerobic conditions.
 5. Indole not produced.
 6. Hydrogen sulfide produced.
 7. Denitrification reaction:
   No gas formation.
 8. Nitrates are reduced.
 9. Catalase formation:
   Positive.
 10. Urease formation:
   Positive.
 11. Starch is hydrolyzed.
 12. Citrates are utilized (in Koser and Christensen media).
 13. Litmus pigment is reduced.
 14. Methylene Blue is reduced.
 15. Water-soluble pigment is formed in potato medium.

IV. Fermentability of carbohydrates:

| Carbohydrates | Acid formation | Gas formation |
|---|---|---|
| Arabinose | − | − |
| Xylose | − | − |
| Glucose | + | − |
| Mannose | + | − |
| Fructose | + | − |
| Galactose | − | − |
| Ribose | + | − |
| Rhamnose | − | − |

-Continued

| Carbohydrates | Acid formation | Gas formation |
|---|---|---|
| Maltose | + | − |
| Saccharose | − | − |
| Lactose | − | − |
| Trehalose | + | − |
| Raffinose | − | − |
| Cellobiose | + | − |
| Sorbitol | − | − |
| Mannitol | + | − |
| Inositol | − | − |
| Glycerin | + | − |
| Glucitol | − | − |
| Salicin | − | − |
| Inulin | − | − |
| Starch | + | − |

When the taxonomical position of the strain B-400 having the above-mentioned mycological properties was examined with reference to *Bergey's Manual of Determinative Bacteriology*, Seventh Edition, the present inventors identified that the strain belonged to the genus *Bacillus megaterium*. Accordingly, the inventors compared the strain B-400 with the type culture sent from American Type Culture Collection (ATCC) to recognize that the strain was similar to *Bacillus megaterium* var. *penicillalyticum* ATCC 14945 but was different therefrom in the following points:

| | *Bacillus megaterium* B-400 | *Bacillus megaterium* var. *penicillalyticum* ATCC 14945 |
|---|---|---|
| Gelatin liquiefaction | Scarce liquefaction | Gradual liquefaction |
| Litmus milk | Pigment is reduced | Pigment becomes alkaline and is not reduced |
| Potato agar slants | Water-soluble brown pigment is formed | No pigment is formed |
| Acid formation from mannose | Acid is formed | No acid is formed |

From the above, the inventors recognized that the strain B-400 is a new strain belonging to the genus *Bacillus megaterium*. The strain B-400 has been deposited under the number "FERM-P No. 748" in the Research Institute of Microorganism Industry, Agency of Industrial Science & Technology, Japan, and also has been deposited in the United States Department of Agriculture, Agricultural Research Service, Northern Utilization Research and Development Division at Peoria, Illinois and has been assigned the numerical designation NRRL B-5385.

Thus, the present invention is a process for producing 7-ADCA comprising deacylating a water-soluble salt of a 7-acylamino desacetoxy cephalosporanic acid by treatment in the presence of an aqueous medium with an enzyme preparation derived from the culture of a deacylating enzyme-producing strain belonging to the genus *Bacillus*. This process is high in yield of 7-ADCA but cannot be said to be a commercially advantageous process for such reasons that the deacylating enzyme is required to be separated from the culture of the deacylating enzyme-producing strain; the concentration of the resulting 7-ADCA is low so that the separation of the water-soluble 7-ADCA from the reaction liquid is costly; and the re-use of the deacylating enzyme is substantially impossible.

In view of the above, the present inventors made further studies on processes in which the deacylating enzyme is allowed to react in the solid phase. As the result, the inventors have found that when mixed with a culture filtrate of the deacylating enzyme-producing strain, a certain carrier adsorbs the enzyme without inactivating said enzyme and does not release the enzyme under such condition as water-washing, and that when an aqueous solution of a water-soluble salt of 7-acylamino desacetoxy cephalosporanic acid is flowed through a column of said carrier, 7-ADCA is flowed out in the state of an extremely high concentration and, moreover, the enzyme continuously decomposes the 7-acylamino desacetoxy cephalosporanic acid and thus can be used with high efficiency.

The present invention has been accomplished on the basis of the above-mentioned finding and is a process for producing 7-ADCA represented by the general formula (II),

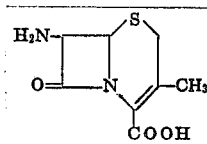

(II)

characterized in that an alkali metal salt of a 7-acylamino desacetoxy cephalosporanic acid (hereinafter referred to as "Ce(I)") represented by the general formula (I),

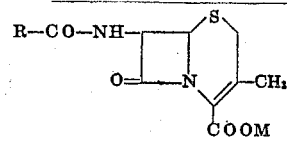

(I)

wherein R is a benzyl or phenoxymethyl group, and M is an alkali metal atom capable of forming a water-soluble salt, is treated with a culture filtrate of an enzyme-producing strain belonging to the genus *Bacillus* which can decompose the amide bond of the said compound Ce(I), or is treated in an aqueous medium with an enzyme preparation derived from said enzyme-producing strain.

The present invention further involves a process for producing the 7-ADCA, characterized in that the above-mentioned Ce(I)-deacylating enzyme is adsorbed on a carrier which does not inactivate said enzyme, an aqueous solution of Ce(I) is added to said carrier to deacylate the Ce(I), and 7-ADCA is recovered from the reaction liquid.

An object of the present invention is to provide a novel process for enzymatically producing an intermediate for antibiotic cephalosporins which are quite useful as chemical therapeutic preparations.

Another object of the invention is to provide a commercially advantageous process for producing 7-ADCA, in which the above-mentioned enzyme reaction is continuously effected in the solid phase by adsorbing the deacylating enzyme on a carrier, and thus the enzyme can be repeatedly used without being inactivated.

The Ce(I)-deacylating enzyme-producing strain used in the present invention is, for example, *Bacillus megaterium* B–400 FERM–P No. 748.

The enzyme capable of decomposing the amide bond of Ce(I) which is used in the present invention is obtained by aerobically culturing *Bacillus megaterium* B–400 FERM–P No. 748 at 20° to 37° C, for 12 to 60 hours in a medium which is ordinarily used for the cultivation of bacteria, e.g. a nutrient medium containing proper amounts of a nitrogen source such as peptone, meat extract, corn steep liquor, yeast extract, dry yeast, soybean protein decomposate or soybean lixiviate; a carbon source such as molasses, glucose or glycerin; and inorganic salts; and, in some cases, other growth-promoting materials. Generally, aeration stirring culture in liquid is effected.

The above-mentioned enzyme is ordinarily an exo-enzyme and is present in a culture filtrate freed from the cells. In the enzyme reaction, therefore, the enzyme is used in the form of a culture filtrate or of an enzyme preparation prepared from the culture filtrate. The enzyme preparation is obtained by subjecting the enzyme to a known purification method. For example, it is obtained by concentrating or not concentrating the culture filtrate and precipitating the enzyme by semisaturation or saturation with a soluble salt such as ammonium sulfate or sodium chloride or precipitating the same by addition of a hydrophilic organic solvent such as methanol, ethanol or acetone. The precipitate is dissolved in water, and the resulting solution is dialyzed by use of a semipermeable membrane, whereby low molecular weight impurities can be removed. Alternatively, taking advantage of the difference in adsorption affinity for a adsorbent or gel-filtering agent, low molecular weight impurities, colored substances, proteins and the like materials in the culture liquor can effectively be separated according to an ordinary procedure such as adsorption chromatography, ion-exchange chromatography or gel filtration. The enzyme solution obtained according to the above-mentioned procedures may be subjected to reduced pressure concentration, freeze-drying or the like operation to obtain a standard enzyme product in the form of solid, or may be used as it is for the treatment of Ce(I). In case the enzyme preparation is required to be further purified, there may be adopted any of the ordinary means adopted for purification of proteins and enzymes in which is used, for example, an adsorbent, a gel-filtering agent or the like.

Ordinarily, the enzyme reaction is carried out in such a manner that Ce(I) is dissolved in water or a buffer solution and is then treated with the above-mentioned enzyme preparation. The CE(I) is brought into the form of a water-soluble sodium or potassium salt, in general, and is used at a concentration within the range from 0.1 to 20 mg/ml., preferably from about 2 to 5 mg/ml. The pH of the reaction liquid is preferably maintained within the range from about 7 to 8. The reaction temperature is from 30° to 45° C., preferably from about 35° to 40° C., whereby favorable results can be obtained. The reaction time varies depending on the reaction conditions, but is ordinarily from about 5 to 30 hours, and the reaction may be terminated at a suitable stage, examining the time at which the yield of the 7–ADCA represented by the general formula (II) becomes maximum.

The kind of the carrier used in the present invention varies depending on the kind of the Ce(I)-deacylating enzyme-producing strain used. However, it is necessary to select the carrier in consideration of the points that it can adsorb the deacylating enzyme without inactivating the same; it does not release the enzyme even when washed with water or the like; it has no detrimental influence on the Ce(I)-decomposing enzyme reaction; and it difficultly adsorbs the resulting 7–ADCA. For example, when an inorganic carrier such as Celite, terra alba, active clay, kaolin, active carbon or silica gel, an ion exchanger such as CM-Cellulose or CM-cephadex C-25, or an ion-exchange resin such as Amberlite CG-50 or Dowex-50 is used as the carrier, the Ce(I)-deacylating enzyme produced by *Bacillus megaterium* B–400 is well adsorbed without being inactivated, but when alumina, cellulose powder, DEAE-Cellulose, DEAE-Cephadex-25 or anion-exchange resin is used, the deacylating enzyme is scarcely adsorbed, or is inactivated even if it has been adsorbed.

In adsorbing the Ce(I)-deacylating enzyme on the carrier, it is desirable that the pH of the culture filtrate of Ce(I)-deacylating enzyme-producing strain is previously adjusted to the stable pH for the deacylating enzyme. For example, in adsorbing a deacylating enzyme produced by *Bacillus megaterium* on Celite, the pH of the culture filtrate thereof is adjusted to about 6 to 8, in general. however, particularly when an ion exchanger or ion-exchange resin, which is affected by the ionic strength, is used, the adsorption power or inactivation degree of the deacylating enzyme tends to be dominated by the pH, so that the carrier should be used in sufficient consideration of the influence of the pH.

The operation of adsorbing the deacylating enzyme on the carrier may be carried out according to any of batch-wise procedure or column-wise procedure. The amount of the carrier to be used varies depending on the amount and enzyme titer of the culture filtrate of deacylating enzyme-producing strain and on the adsorption ratio of the deacylating enzyme to the carrier. In adsorbing the enzyme according to the batch-wise procedure, however, the amount of the carrier used may be about 5 to 15 W/V percent based on the amount of the culture filtrate. In the case of adsorption according to the batch-wise operation, a mixture of the culture filtrate and the carrier is stirred, and then the carrier is separated and washed with water, while in the case of adsorption according to the column-wise procedure, the carrier packed in a column is wetted with water or with a buffer solution adjusted to the stable pH of the deacylating enzyme, the culture filtrate is passed through the column, and then the column is washed with water, whereby a carrier which has adsorbed the deacylating enzyme can be obtained.

When the thus obtained carrier which has adsorbed the deacylating enzyme is dried, the deacylating enzyme tends to be inactivated. Accordingly, it is desirable that the carrier is used in the subsequent Ce(I)-deacylating enzyme reaction in such a wet state as not to be dried.

The Ce(I) used in the present invention may be prepared according to a known process, e.g. a process in which a penicillin sulfoxide ester is subjected to ring expansion (U.S. Pat. No. 3,275,626, Belgian Pat. No. 696,026, Dutch Pat. Publication No. 6,806,532, Belgian Pat. No. 745,845, British Pat. No. 1,204,394, and Belgian Pat. No. 747,118, 747,119 and 747,120), and the resulting 7-acylamino desacetoxy cephalosporanic acid ester is de-esterified, or a process in which a 7-acylamino cephalosphoranic acid is de-acetoxidized (U.S. Pat. No. 3,275,626). However, the subsequent Ce(I)-deacylating enzyme reaction is carried out in a solution system, so that the Ce(I) is used, in general, in the form of a water-soluble alkali metal salt, e.g. a sodium or potassium salt.

In the next place, an aqueous solution of Ce(I) is treated with the deacylating enzyme-adsorbed carrier. In this case, it is desirable that the solution is previously buffered with a buffer solution having the same pH as the proper pH of the deacylating enzyme. The above-mentioned enzyme reaction is effected, in general, according to the column-wise procedure for such reason that the reaction can be effected continuously. The concentration of Ce(I) to be added varies depending chiefly on the enzyme titer, i.e., the Ce(I)-deacylating ability, of the deacylating enzyme and the flow rate, but is desirably decided in consideration of the point that the amount of unreacted Ce(I) left in the flowed-out reaction liquid becomes not larger. Generally, the concentration of Ce(I) is 0.1 to 2.0 W/V percent, preferably about 0.5 to 1.0 W/V percent, but it is needless to say that the concentration varies more or less depending on the kind of the carrier used. The above-mentioned reaction is, of course, effected at proper pH and temperature, preferably the optimum pH and temperature, of the Ce(I)-deacylating enzyme. However, it is desirable that various reaction conditions are selected so that 7–ADCA formed in the reaction liquid is flowed out at a concentration as high as possible. The reaction time may be properly varied by increasing or decreasing the amount of the aqueous Ce(I) solution added. Generally, the reaction is complete before the aqueous Ce(I) solution has passed through the carrier layer in the column. However, in case the Ce(I)-deacylation ratio has been low and a large amount of Ce(I) has been left in the reaction liquid, the reaction liquid is again added as it is to the said carrier layer or is added to other carrier layer which has adsorbed the deacylating enzyme, whereby a reaction liquid high in Ce(I)-deacylation ratio can be obtained.

In case the above-mentioned enzyme reaction is desired to be carried out in a continuous manner, it is sufficient that the aqueous Ce(I) solution is continuously added to the deacylating enzyme-adsorbed carrier layer. However, the Ce(I)-deacylating ratio tends to gradually decrease day by day due to migration of miscellaneous bacteria or the like. In case toluene has been added to the top of the column or to the substrate, the detrimental effect due to contamination can be minimized.

In the present process, one carrier layer can be used for more than 10 days, so that 7–ADCA can be recovered in high yield and produced at low cost. Accordingly, the present process may be said to be an extremely advantageous process for producing 7–ADCA by enzymatic deacylation of Ce(I).

The recovery of 7–ADCA from the thus obtained reaction liquid may be carried out according to a known procedure. For example, the reaction liquid is adjusted to a pH of about 2 and washed with a hydrophobic organic solvent such as ethyl acetate, butyl acetate or methyl isobutyl ketone to remove unreacted Ce(I), and then the water layer is concentrated and then adjusted with cooling to a pH of about 3.7 to precipitate the 7–ADCA isoelectrically. Alternatively, the reaction liquid is adjusted to a pH of about 3.7, concentrated and then cooled, and the resulting precipitate is washed with acetone to remove unreacted Ce(I) and by-produced carboxylic acid. In the above manner, the 7–ADCA can be recovered. Method of measuring the activity of adsorbed enzyme:

A carrier which has adsorbed the deacylating enzyme is weighed in a L-shaped test tube. To the test tube is added 4.5 ml. of a 0.1 M phosphate buffer solution (pH 7.5), and the test tube was shaken for 10 minutes in a Monod type thermostat shaker kept at 37° C. Subsequently, 0.5 ml. (10 mg/ml. in terms of free acid) of an aqueous solution of sodium salt of 7-phenylacetamide desacetoxy cephalosporanic acid is added, and the resulting mixture is reacted for 30 minutes. After the reaction, the reaction liquid is immediately cooled, and 7–ADCA in the reaction mothor liquid freed from the carrier is determined according to TNBS method.

An enzyme titer forming 100 γ/ml. of 7–ADCA is deemed to be 100 units (U).

METHODS OF DETERMINATION of 7–ADCA

1. Determination Method 1:

The reaction liquid is subjected to microorganism test (37° C. 16 hours) according to paper disk method or cup method using *Bacillus subtilis* PCI–219 as a test strain, and the diameter of the circle inhibiting the growth thereof is measured. From the standard curve of Ce(I) is calculated the amount of Ce(I), and the difference in amount between the starting Ce(I) and the residual Ce(I) is represented by a percentage to the starting Ce(I). This percentage is the decomposition ratio of the starting Ce(I).

2. Determination Method 2

A definite amount of the reaction liquid is adjusted to pH 2.5 by use of 1N-hydrochloric acid, washed 3 times with one half the amount thereof of butyl acetate, and then adjusted to pH 7.5 by use of an aqueous 1N-sodium hydroxide solution. Subsequently, a definite amount of the thus treated reaction liquid is treated with an acid chloride corresponding to the acid on the side chain of the starting Ce(I), and then subjected to the same microorganism test as in Determination Method 1. From the amount of the resulting Ce(I) is calculated backward the amount of 7–ADCA, which is then represented by a percentage. This percentage is the yield of the 7-ADCA.

3. Determination Method 3, TNBS Method:

To 1 ml. of a sample are added 2 ml. of a 0.3 M phosphate buffer solution (pH 8.0) and 2 ml. of a 0.1 percent TNBS solution, and the resulting mixture is reacted in the dark at 50° C. for 90 minutes. After cooling, the reaction liquid is charged with 1 ml. of 6N-hydrochloric acid and is measured in absorbancy at 395 mμ, and the amount of 7–ADCA is calculated from the standard curve of 7–ADCA.

The present process is illustrated in detail below with reference to examples, but strains, reaction conditions and reaction operations are not limited to those shown in the examples but can be varied properly.

EXAMPLE 1

Preparation of enzyme preparation:

20 Liters of a liquid culture medium (pH 7.0) containing 1 percent of polypeptone, 1 percent of yeast extract and 0.5 percent of sodium chloride was fed to a 30 liter-jar fermentor, and sterilized for 20 minutes with steam at 120° C. Thereafter, 200 ml. of a seed culture liquor of *Bacillus megaterium* B-400 FERM-P No. 748, which had been cultured at 30° C. for 24 hours in a culture medium of the same composition as above, was transferred under sterile conditions to the aforesaid culture medium, and fermented at 30° C. for 48 hours with aeration and stirring at an air introduction rate of 20 liters per minute and a stirring rate of 300 r.p.m. After the fermentation, the cells were removed by means of a Westfalia centrifugal separator to obtain 17.4 liters of a culture filtrate.

EXAMPLE 2

The culture filtrate obtained in Example 1 was concentrated to ⅛ at an external temperature of 30° to 35° C., and the concentrate was charged with ammonium sulfate until a 80 percent saturation was attained. The deposited precipitate was dissolved in distilled water and desalted by use of a column of Cephadex G-25, and the desalted solution was freeze-dried to obtain 24.3 g. of a standard enzyme product.

EXAMPLE 3

Preparation of enzyme preparation:

20 Liters of a liquid culture medium (pH 7.0) containing 0.5 percent of glucose, 0.3 percent of glycerin, 1.0 percent of meat extract and 1.0 percent of polypeptone was fed to a 30 liter-jar fermentor, and sterilized for 20 minutes with steam at 120° C. Thereafter, 200 ml. of a seed culture liquor of *Bacillus megaterium* B-400 FERM-P No. 748, which had been cultured at 30° C. for 24 hours in a culture medium of the same composition as above, was transferred under sterile conditions to the aforesaid culture medium and fermented at 30° C. for 72 hours with aeration and stirring at an air introduction rate of 20 liters per minute and a stirring rate of 300 r.p.m. After the fermentation, the cells were removed by means of a Westfalia centrifugal separator, and the filtrate was concentrated to ⅛ at an external temperature of 30° to 35° C. The concentrate was charged with acetone until the amount of acetone became 60 percent, and the deposited precipitate was recovered by filtration and then dried to obtain 25.5 g. of a standard enzyme product.

10 Liters of the culture filtrate of *Bacillus megaterium* B-400 FERM-P No. 748 obtained in Example 2 was adjusted to a pH of about 7 by use of acetic acid. To the culture filtrate was added 500 g. of diatomaceous earth, and the resulting mixture was stirred for about 30 minutes. During this time, the pH was always maintained at about 7. Subsequently, the reaction liquid was centrifuged by means of a basket type centrifugal separator and then washed with water to obtain 750 g. of wet Celite (enzyme titer 1,200 U/g).

EXAMPLE 5

The culture filtrate of *Bacillus megaterium* B-400 FERM-P No. 748 obtained in Example 2 was adjusted to a pH of about 7. To each 1 liter of the culture filtrate were individually added each 50 g. of Celite (Hyflo Super Cel), active carbon (produced by Wako Junyaku Co.; for chromatography), CM-Cellulose Ion-Exchange (produced by Serva Co.; 0.52 mcg/g) and Amberlite CG-50 (H-form), and the resulting mixture was stirred for about 30 minutes. During this time, the pH was always maintained at about 7. Subsequently, each carrier was recovered by filtration and then washed with water to obtain a wet carrier. The enzyme adsorption ratio of each carrier was calculated, assuming as 100 percent the enzyme adsorption ratio of Celite. The results obtained were as follows:

| Carrier | Relative adsorption ratio (%) |
|---|---|
| Celite | 100 |
| Active Carbon | 100 |
| CM-Cellulose | 100 |
| Amberlite CG-50 | 81.2 |

EXAMPLE 6

The deacylating enzyme-adsorbed Celite (enzyme titer 1,800 U/g) obtained in Example 8 was buffered by washing with a 0.01M-phosphate buffer solution (pH 7.5), packed in a jacket tube-equipped column (5 × 50 cm.), and then washed for about 1 hour at a definite flow rate (space velocity ≈ 0.5) with the same buffer solution as above.

The external temperature of the column was made definite by flowing hot water at 37° C. to the jacket tube. Thereafter, 6 liters (5 mg/ml. in terms of free acid) of an aqueous solution of sodium 7-phenylacetamide desacetoxy cephalosporanate was flowed through the column at a definite flow rate (space velocity ≈ 0.5), and the outflow liquid was fractionated into individual fractions (amount of fraction 10.8 ml.). A time of about 16 hours was required for completion of the flowing-out.

6.4 Liters of the total outflow liquid was adjusted to pH 6 and then concentrated to about 1/10. The concentrate was adjusted to pH 3.7 by use of 6N-hydrochloric acid, whereby the formed 7-ADCA initiated to deposit. This concentrate was cooled with ice to complete the deposition, and the deposit was recovered by filtration, washed with a small amount of ice water, sufficiently dried with acetone and then dried to obtain 14.0 g. of white 7-ADCA, m.p. 240° – 242° C., yield 72.4 percent. This product was dissolved in an aqueous 2.5N-sodium hydroxide solution, and the resulting solution was decolored with active carbon, adjusted to pH 3.7 by use of 6N-hydrochloric acid and then cooled with ice to deposit the 7-ADCA. Subsequently, the 7-ADCA was recovered by filtration, washed with a small amount of ice water, washed with acetone and then dried, whereby 11.4 g. of a purified product was obtained.

EXAMPLE 7

Example 6 was repeated, except that each of the enzyme-adsorbed active carbon, enzyme-adsorbed CM-Cellulose and enzyme-adsorbed Amberlite CG-50 obtained in Example 5 was used in place of the deacylating enzyme-adsorbed Celite, to prepare 7-ADCA. The results obtained were as follows:

| Kind of carrier | Amount obtained (g) | Yield (%) |
|---|---|---|
| Active carbon | 37.5 | 58.2 |
| CM-Cellulose | 32.9 | 51.8 |
| Amberlite CG-50 | 31.3 | 48.5 |

EXAMPLE 8

The same cultivation as in Example 1 was effected to obtain a culture. 1 Liter of this culture was transferred to a 250 liter-culture tank containing 200 liters of a medium of the same composition as in Example 1, and cultured at 30° C. for 48 hours. Two of the said 250 liter tank were operated to obtain 350 liters of a culture filtrate. To the culture filtrate was added 3.5 kg. of Celite, and the resulting mixture was stirred for 30 minutes while maintaining the pH at 7. Subsequently, the mixture was dehydrated by centrifuge, and the residue was washed with water to obtain 5.2 kg. of wet Celite (enzyme titer 5,000 U/g). This Celite was packed in a vinyl chloride column of 120 × 900 mm. in size, and a solution of 5 mg/ml. of 7-phenylacetamide-desacetoxy cephalosporanic acid in a 0.05M-phosphate buffer (pH 7.5) was flowed through the column while maintaining the temperature at 37° C. (total amount 1.8 kg/360 liters, flow rate 5 liters/hr.). The elution was complete in 72 hours to obtain a total of 375 liters of an eluate. To this eluate was added 290 liters of acetone, and the resulting mixture was adjusted to pH 4.0 by use of 6N-HCl, sufficiently stirred for 30 minutes and then allowed to stand overnight to deposit a precipitate. The precipitate was recovered by filtration, washed with acetone and then dried to obtain 1,130.2 g. of crystals of 7-ADCA (purity 90.0 percent), yield 89.2 percent.

We claim:

1. A process for producing 7-amino desacetoxy cephalosporanic acid represented by the general formula:

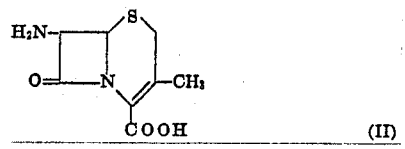

(II)

which comprises treating an aqueous solution of an alkali metal salt of a 7-acylamino desacetoxy cephalosporanic acid represented by the general formula:

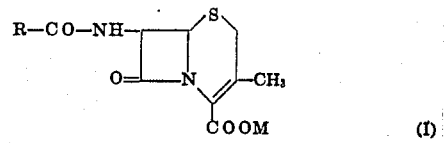

(I)

wherein R is a benzyl or phenoxymethyl group, and M is an alkali metal atom capable of forming a water-soluble salt, with a deacylating enzyme of *Bacillus megaterium* B-400 FERM-P No. 748 adsorbed on a carrier to permit deacylation of the treated acid and recovering 7-amino desacetoxy cephalosporanic acid from the resulting reaction liquid; said carrier being one which does not inactivate said enzyme, which does not release the enzyme when washed with water, and which difficulty adsorbs the resulting 7-amino desacetoxy cephalosporanic acid.

2. A process according to claim 1, wherein said deacylating enzyme is adsorbed on said carrier from a culture filtrate.

3. A process according to claim 1, wherein said 7-acylamino desacetoxy cephalosporanic acid is in the form of a water-soluble sodium or potassium salt at a concentration within the range of from 0.1 to 20 mg/ml and the salt is treated at a pH within the range of about 7 to 8 at a reaction temperature from 30° to 45° C. for a period of from about 5 to 30 hours.

4. A process according to claim 1, wherein said carrier is an inorganic carrier selected from the group consisting of Celite, terra alba, active clay, kaolin, active carbon, silica gel, and cation exchanger.

* * * * *